(12) United States Patent
Kjellberg

(10) Patent No.: US 7,084,238 B2
(45) Date of Patent: Aug. 1, 2006

(54) BRINE SEPARATION IN TALL SOAP OIL PREPARATION

(75) Inventor: Nils Kjellberg, Järfälla (SE)

(73) Assignee: Linde Aktiengesellschaft, Wiesbaden (DE)

( * ) Notice: Subject to any disclaimer, the term of this patent is extended or adjusted under 35 U.S.C. 154(b) by 0 days.

(21) Appl. No.: 10/820,135

(22) Filed: Apr. 8, 2004

(65) Prior Publication Data
US 2004/0265205 A1    Dec. 30, 2004

Related U.S. Application Data

(63) Continuation of application No. PCT/EP02/10779, filed on Sep. 26, 2002.

(30) Foreign Application Priority Data
Oct. 9, 2001   (EP) .................................. 01124064

(51) Int. Cl.
*C11B 13/02*   (2006.01)
(52) U.S. Cl. ..................... 530/205; 530/208; 530/206
(58) Field of Classification Search ................ 530/205, 530/208, 206, 209
See application file for complete search history.

(56) References Cited

U.S. PATENT DOCUMENTS

| 2,702,235 | A | | 2/1955 | Hochmuth | |
| 3,901,869 | A | * | 8/1975 | Bills | 530/209 |
| 4,495,095 | A | * | 1/1985 | Lawson et al. | 530/209 |
| 5,891,990 | A | * | 4/1999 | Varila et al. | 530/208 |
| 5,898,065 | A | * | 4/1999 | Aitta et al. | 530/205 |
| 6,004,360 | A | * | 12/1999 | Andersson | 44/306 |
| 6,172,183 | B1 | * | 1/2001 | Leino | 530/209 |
| 6,348,566 | B1 | * | 2/2002 | Sarasto | 530/205 |

FOREIGN PATENT DOCUMENTS

| GB | 1112617 | 5/1968 |
| WO | WO-94/11571 A1 | 5/1994 |
| WO | WO-96/34932 A1 | 11/1996 |
| WO | WO-98/29524 A1 | 7/1998 |

OTHER PUBLICATIONS

International Search Report for PCT/EP02/10779, Feb. 12, 2002.

* cited by examiner

*Primary Examiner*—Irina S. Zemel
(74) *Attorney, Agent, or Firm*—Crowell & Moring LLP

(57) ABSTRACT

A process for separating sodium bicarbonate brine from crude tall oil or for separating sulfate brine from soap oil, such as in a recovery process in a pulp mill. A water solution having an increased density is added during the neutralization of crude tall oil soap with carbon dioxide or acidulation of soap oil with sulfuric acid.

14 Claims, 3 Drawing Sheets

BRINE SEPARATION IN TALL SOAP OIL PREPARATION

CROSS REFERENCE TO RELATED APPLICATIONS

This application is a continuation of International Application Patent Application No. PCT/EP02/10779, filed 26 Sep. 2002, designating the United States of America, designating the United States of America, and published in German as WO 03/031545, the entire disclosure of which is incorporated herein by reference. Priority is claimed based on European Patent Application No. 011 240 64.5, filed 9 Oct. 2001.

BACKGROUND AND SUMMARY OF THE INVENTION

The present invention relates to a process for improving the separation of aqueous sodium bicarbonate brine from soap oil in the recovery process of a pulp mill, comprising: forming a mixture comprising crude tall oil soap, water and carbon dioxide, neutralizing the crude tall oil soap and separating the aqueous sodium bicarbonate brine and the soap oil obtained from said neutralization step.

The invention is further related to a process for improving the separation of aqueous sulphate brine from crude tall oil in the recovery process of a pulp mill, comprising: forming a mixture comprising soap oil, water and sulphuric acid, acidulating said soap oil and separating the aqueous sulphate brine and the crude tall oil obtained from said acidulation step.

In chemical pulping wood chips are cooked with appropriate chemicals in an aqueous solution to obtain a fibrous mass. In this process the spent cooking liquor containing several chemicals is recycled. In the following the recycling of the cooking liquor will be referred to as recovery process or recovery system. The recovery process essentially comprises the separation of crude tall oil soap from black liquor, the crude tall oil preparation process, the evaporation of black liquor and subsequently its burning in the recovery boiler, the alkalisation of green liquor received from the recovery boiler and its recycling to the cooking process step.

The cooking liquor is separated from the fibres and washed with water forming weak black liquor. Reacted resin acids and fatty acids which rise to the surface of the black liquor are skimmed off as crude tall oil soap. The black liquor may be subjected to one or more evaporation stages to form strong black liquor with increased solid contents. Additional crude tall oil soap may be removed at these stages.

The strong black liquor is introduced into the recovery boiler which evaporates residual moisture from the liquor, burns the organic constituents and supplies heat for steam generation. The flue gases from the recovery boiler containing a lot of chemicals are passed through an electrostatic precipitator to separate the recovery boiler ash. The recovery boiler ash is a salt mixture essentially containing sodium sulphate and sodium carbonate. Normally the ash is directly recycled into the recovery system by dissolving the ash in the black liquor that is going to be burnt in the recovery boiler.

The crude tall oil soap skimmed off the liquor is conventionally acidulated with sulphuric acid to a pH of about 3 or lower. During this reaction three phases a re formed: crude tall oil, a mixed phase containing fiber and lignin residuals and an aqueous sulphate brine solution. The brine solution and the mixed phase are separated and returned to the recovery system. Sometimes this mixed phase causes problems as it sticks to the equipment and extra cleaning is necessary. The obtained crude tall oil is used internally as a fuel or externally as a valuable raw material for the chemical industry. The consumption of sulphuric acid in the acidulation of the crude tall oil represents an increasing problem to modem pulp mills. The amount of sulphuric acid for this reaction forms a major part of the total intake of sulphur make-up to the recovery system of the pulp mill. However, due to environmental considerations sulphur emissions into the environment are increasingly unacceptable and there is a strong need to reduce the amount of sulphur and sulphuric compounds required in the recovery process of a pulp mill.

The sulphuric acid consumption may be reduced by about 30% to 50% by a pretreatment of the crude tall oil soap with carbon dioxide. According to such a process, which is disclosed in WO 98/29524, the crude tall oil soap is subjected to carbonic acid prior to the final separation of black liquor and soap, thereby removing impurities from the crude soap and hence reducing the amount of acid to acidify the soap. The carbon dioxide acidulation has the further advantage that the sticky components of the mixed phase are dissolved in the sodium bicarbonate brine and do not stick to the equipment. In the technical operation it is difficult to obtain a high degree of bicarbonate brine separation from the soap oil after the carbon dioxide neutralization step due to the creamy consistency of the soap oil. However, any remaining bicarbonate brine in the soap oil will increase the sulphuric acid consumption in the final acidification step which for environmental reasons is to be avoided.

To overcome this problem WO 96/34932 suggests to carry out an additional step of pH adjustment after the carbon dioxide pre-treatment but prior to the bicarbonate brine separation step. The pH adjustment may be performed by adding a substance with acidic activity, such as sulphuric acid or bisulphite. One drawback of this solution is that it reduces the efficiency of the carbon dioxide pre-treatment, as it increases the amount of sulphur introduced into the recovery system.

An object of the present invention is to provide an improvement in the separation of bicarbonate brine in the soap oil preparation process and to reduce the amount of sulphuric compounds required in the final acidulation step.

Another object of the present invention is to improve the separation of sulphate brine and crude tall oil in the final acidulation of the crude tall oil preparation process.

These and other objects and advantages are achieved by processes for removing brine in a recovery process in a pulp mill according to the invention. In an embodiment, the invention comprises neutralizing a crude tall oil soap by forming a mixture comprising crude tall oil soap, water and carbon dioxide; and separating aqueous sodium bicarbonate brine and soap oil obtained from said neutralization, wherein said mixture comprises a water solution having an increased density. In another embodiment, the invention comprises acidulating a soap oil by forming a mixture comprising soap oil, water and sulphuric acid; and separating aqueous sulfate brine and crude tall oil obtained from said acidulation step, wherein said mixture comprises a water solution having an increased density In an embodiment, the invention relates to a process for improving the separation of sodium bicarbonate brine from soap oil in a tall oil recovery process comprising the following steps: The crude tall oil soap is mixed with a high-density water solution and carbon dioxide. The resulting acid neutralises the crude tall oil soap whereby forming a two phase solution of crude soap oil and sodium bicarbonate brine. Subsequently the aqueous sodium bicarbonate brine is separated from the soap oil obtained.

After the separation of the sodium bicarbonate brine from the soap oil a final acidulation is carried out. After the final acidification it can also be difficult to get a good separation of the resulting sulphate brine from the resulting crude tall oil. This is due to the reduced difference in density between the phases which is a consequence of the reduced charge of sulphuric acid in the final acidulation step.

In another embodiment, the use of the inventive high density water solution is also advantageous in the final acidulation step as an additive to the sulphuric acid. This will result in sulphate brine with higher density that thus is easier to separate from the crude tall oil phase. The water and brine content of the final crude tall oil is minimized, increasing the quality and the effective yield of crude tall oil.

In an embodiment carbon dioxide is first dissolved in said water solution having increased density to form an acidic solution and afterwards the crude tall oil soap is neutralized with said acidic solution.

It is also advantageous to first dilute the crude tall oil soap with said water solution having increased density and then introduce carbon dioxide into the soap-water solution:

Due to the inventive use of water having an increased density the carbon dioxide treatment results in a bicarbonate brine with higher density compared to the state of the art processes. Thus it is easier to separate the soap oil and the brine solution.

The high density water is preferably prepared by mixing ash and/or dust from the recovery process, in particular precipitator ash, with water. Beside the desired increase in the density of the water such a preparation has the additional advantage that no other substances, in particular no additional chemicals, are added to the recovery process.

In an embodiment, ash and dust are separated by an electrostatic precipitator from the flue gases of the recovery boiler. Conventionally precipitator ash or dust is recirculated to the recovery system by mixing it to the strong black liquor prior to entering the recovery boiler. According to the invention, the precipitator ash is not directly recirculated to the black liquor, but first used to form said high-density water. The high-density water is mixed with the crude tall oil soap and carbon dioxide for the soap neutralization or, in the acidulation step, is mixed with soap oil and sulphuric acid. In this way the precipitator ash is also returned to the black liquor and the recovery boiler, however the recovery cycle is longer. Compared to conventional processes the precipitator ash is additionally used to form said high density water solution before ending up in the same position, that is in the black liquor system. According to the invention no additional external sulphate is added to the recovery process.

The invention uses the physical effects due to the difference in density between the soap oil respectively the tall oil and the brine phases when using the high-density water solution. However, a density that is too high may limit the carbon dioxide solubility in the water which reduces the achievable pH in the soap treatment. This is disadvantageous as a pH of about 8 should be reached in order to have the separation of soap oil and bicarbonate brine. Therefore, an increasing density of the water solution has the positive effect of increasing the relative density difference between the bicarbonate brine and the soap oil, but the negative effect of decreasing the soap oil formation. It has been found that the preferred water solution should have a density between 1000 kg/m$^3$ and 1500 kg/m$^3$, more preferably between 1050 kg/m$^3$ and 1300 kg/m$^3$ and most preferably between 1100 kg/m$^3$ and 1200 kg/m$^3$.

In a preferred embodiment sodium and/or potassium salts of sulphate and/or carbonate and/or chloride are used to increase the density of the water. Such salts may be sodium sulphate, sodium carbonate, sodium chloride or mixtures thereof. Preferably ash or dust from the recovery boiler is dissolved in the water that is used to dissolve carbon dioxide therein.

The water can be fresh water or water or an aqueous solution recirculated within the recovery process. For example, it is possible to use a partially recycled sulphate brine solution, another internally recirculated liquid such as an evaporation condensate, or anything similar.

After the separation of the sodium bicarbonate brine from the soap oil the final acidulation is preferably carried out with sulphuric acid or spent acid from the chlorine dioxide preparation. The spent acid, a waste stream from the pulp mill, is a mixture of sulphuric acid and sodium sulphate. The amount of sulphuric acid or spent acid necessary is reduced by about 30% to 50% compared to processes without carbon dioxide pre-treatment. As a result of the acidulation a sulphate brine phase and a crude tall oil phase are formed.

Preferably the change in pH after the neutralization of the crude tall oil soap and prior to the separation of sodium bicarbonate from soap oil is less than 0.2, more preferably less than 0.1, and still more preferably there is essentially no change in pH. According to a preferred embodiment of the present invention the neutralization step is directly followed by the separation of the bicarbonate brine without any intermediate addition of any substances, in particular without adding any pH changing substances.

Using the recovery boiler ash in the proposed manner the external intake of sulphur to the pulp mill recovery system is not influenced and thus the full efficiency of the carbon dioxide pre-treatment to reduce the mill sulphur intake will be maintained or even improved as less remaining bicarbonate brine in the soap oil will further reduce the sulphuric acid needed in the final acidulation.

The invention will now be illustrated in greater detail with reference to the appended drawings. It is obvious for the man skilled in the art that the invention may be modified in many ways and that the invention is not limited to the specific embodiment described in the following example.

DETAILED DESCRIPTION OF THE INVENTION

Figure 1:
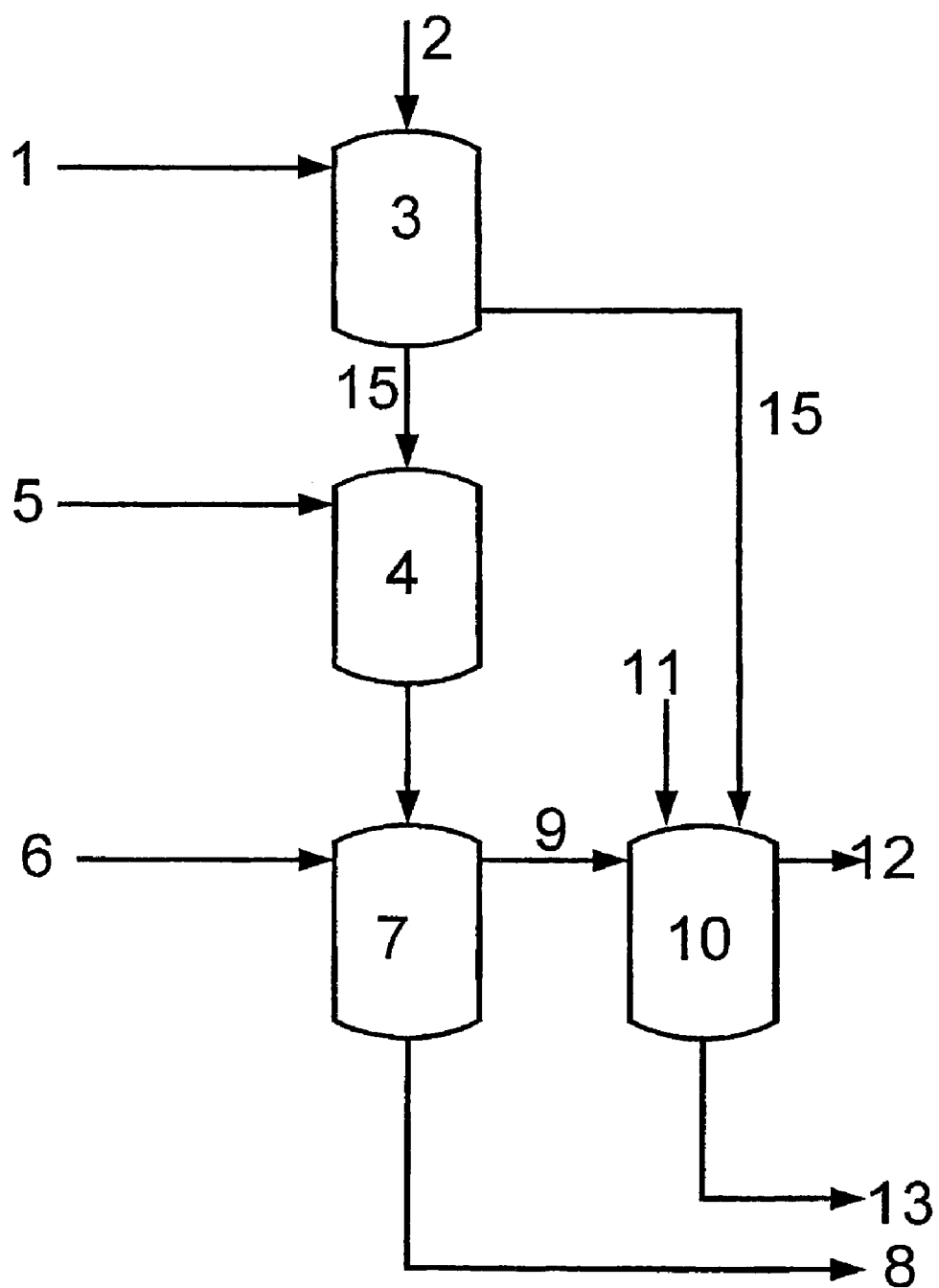
FIG. 1 shows a schematic drawing of the tall oil recovery system according to an embodiment of the invention.

As schematically shown in FIG. 1, water 1 and recovery boiler ash 2 are introduced into a dissolving tank 3. In an embodiment, the recovery boiler ash is a mixture of about 90% sodium sulphate, 9% sodium carbonate and 1% sodium chloride, and is separated from the recovery boiler flue gases by using electrostatic precipitators. In the dissolving tank 3 a water solution 15 is prepared which has an increased density of 1200 kg/m$^3$ achieved by dissolving ash and dust 2 from the recovery boiler into the water 1.

The high density water solution 15 is fed to a vessel 4. Further carbon dioxide gas 5 is introduced into the vessel 4 and dissolved in the high density water solution 15. The so prepared high density carbonic acid solution is pumped to the tall oil plant. In the tall oil plant crude tall oil soap 6 is neutralized with the high density water solution in a neutralization reactor 7.

After this carbon dioxide pre-treatment process, two phases are formed within the neutralization reactor 7: a bicarbonate brine which collects at the bottom of the neutralization reactor 7, and the soap oil phase on top of the brine. Due to the inventive use of the high density water 15, the bicarbonate brine has an increased density compared to brine resulting from the state of the art neutralization reactions. Thus the brine can easily be separated from the soap oil and is returned to the recovery process 8.

The soap oil phase is fed from the neutralization reactor 7 via pipe 9 to the acidulation reactor 10. In the reactor 10 the soap oil is finally acidulated with sulphuric acid 11 and an additive of the high density water solution 15. After the acidulation a sulphate brine phase and a crude tall oil phase are obtained. As a consequence of the addition of the high density water solution 15 the sulphate brine has an increased density and is thus easier to separate from the crude tall oil phase. The tall oil 12 is gathered from the top of the acidulation reactor 10 whereas the sulphate brine 13 is recycled in the recovery process.

Figure 2:
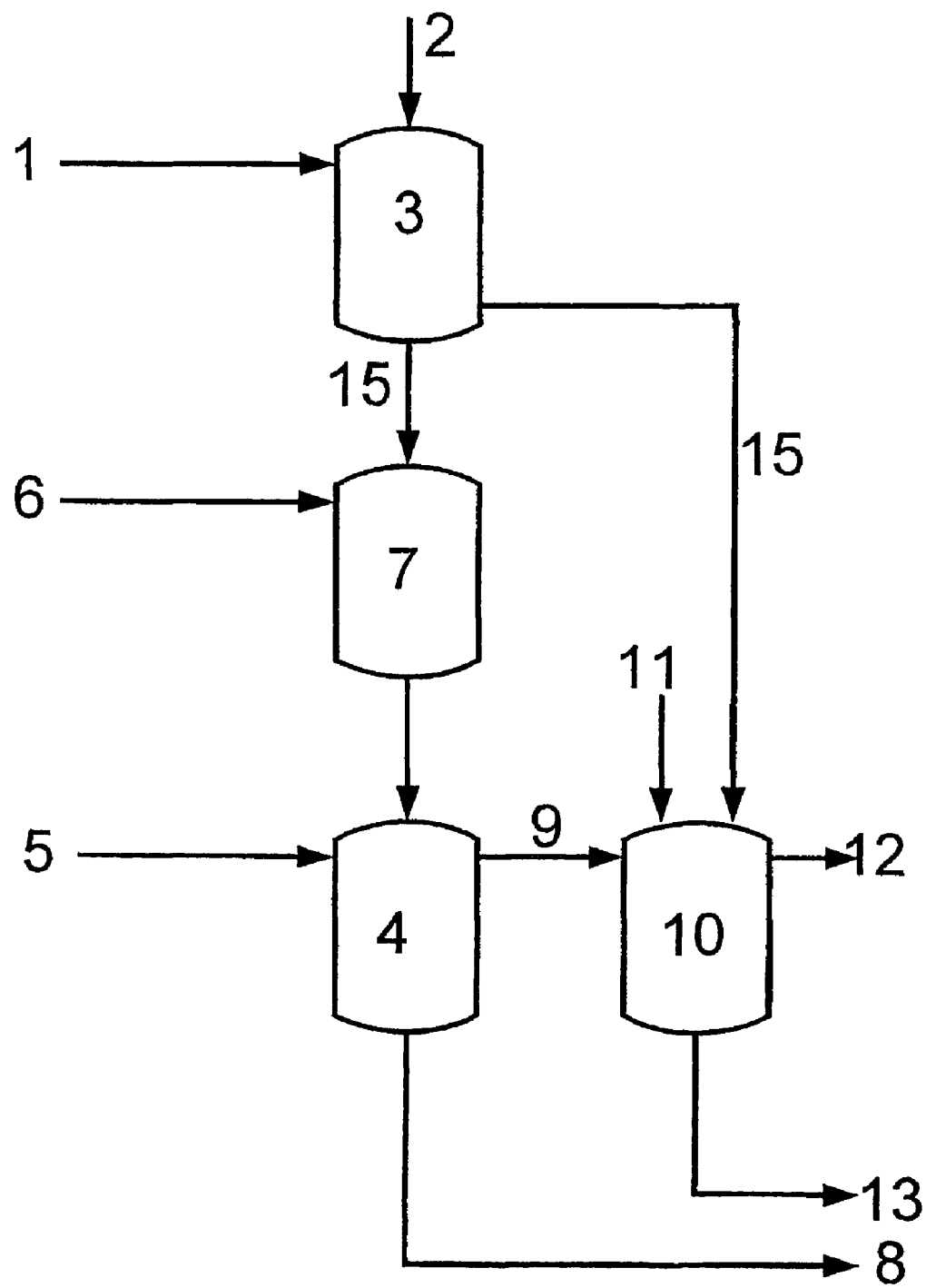
FIG. 2 shows the same system with a different order of mixing according to an embodiment of the invention.

In another embodiment, instead of first introducing carbon dioxide 5 into the high density water solution 15 and then mixing the resulting carbonic acid with crude tall oil soap 6, it is also advantageous to change the order of adding carbon dioxide 5 and crude tall oil soap 6. Such a process is shown in FIG. 2. First crude tall oil soap 6 is diluted with the high density water 15 obtained from vessel 3. Into the resulting solution carbon dioxide 5 is introduced to neutralize the crude tall oil soap 6.

Figure 3:
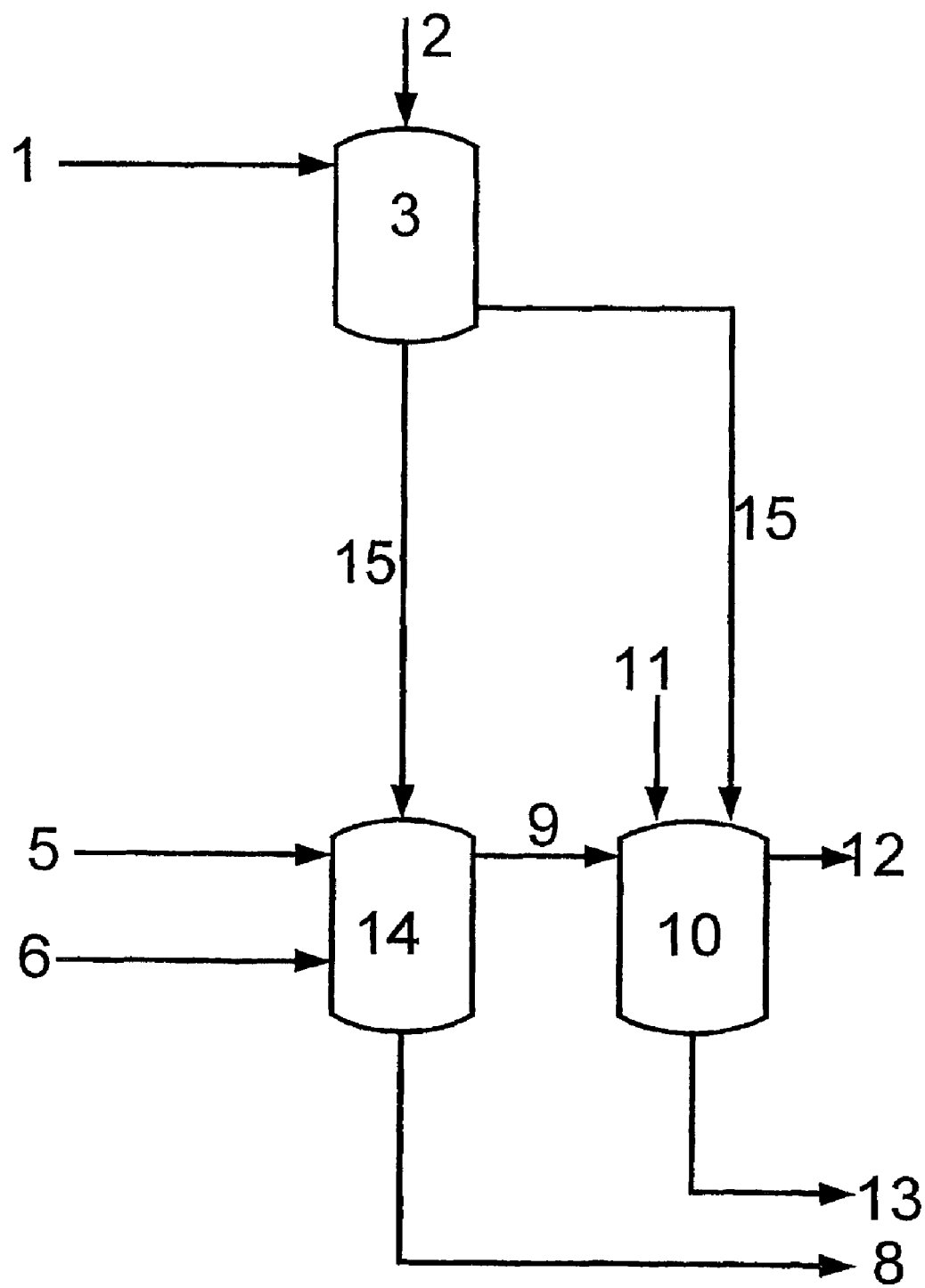
FIG. 3 shows another embodiment of the inventive system.

In still another embodiment, the above described process may also be performed as a continuous process. That is instead of using separate reactors 3, 4, 7, 10, some or all of these process steps can be done in one reactor vessel. One such example is shown in FIG. 3. Instead of using two vessels 4, 7, as shown in FIGS. 1 and 2, the high density water 15, carbon dioxide 5 and crude tall oil soap 6 are mixed in one vessel 14. It is also possible to have only one vessel instead of vessels 3 and 14 or to have one common reactor vessel for all described process steps.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for separating aqueous sodium bicarbonate brine from soap oil in the recovery process of a pulp mill, comprising:
   neutralizing a crude tall oil soap by forming a mixture comprising crude tall oil soap, water and carbon dioxide; and
   separating aqueous sodium bicarbonate brine and soap oil obtained from said neutralization,
   wherein said mixture comprises a water solution having an increased density, said increased density resulting from mixing ash or dust from a recovery process with the water.

2. A process according to claim 1 wherein neutralizing said crude tall oil soap comprises diluting said crude tall oil soap with said water solution having an increased density and then mixing the diluted crude tall oil soap with carbon dioxide.

3. A process according to claim 1, wherein said ash or dust from said recovery process is precipitator ash.

4. A process according to claim 1 wherein said ash or dust comprises one or more sodium or potassium salts of a sulfate, carbonate or chloride, said one or more salts being dissolved in water to form said water solution having an increased density.

5. A process according to claim 1 wherein said water solution having an increased density has a density from about 1000 kg/m$^3$ to about 1500 kg/m$^3$.

6. A process according to claim 5, wherein said water solution having an increased density has a density from about 1050 kg/m$^3$ to about 1300 kg/m$^3$.

7. A process according to claim 5, wherein said water solution having an increased density has a density from about 1100 kg/$^3$ to about 1200 kg/m$^3$.

8. A process according to claim 1 wherein forming said water solution having increased density comprises mixing said ash or dust with water recirculated within said recovery process.

9. A process according to claim 8 wherein said ash or dust is mixed with water containing sulfate brine solution.

10. A process according to claim 1 further comprising treating said soap oil with sulfuric acid.

11. A process according to claim 10 wherein a water solution having an increased density is added to said sulphuric acid.

12. A process according to claim 1 wherein after said neutralization and prior to said separation of said sodium bicarbonate brine and said soap oil, a change in pH of said mixture is less than 0.2. preferably less than 0.1, and most preferably there is no change in pH.

13. A process according to claim 12 wherein after said neutralization and prior to said separation, the change in pH of said mixture is less than 0.1.

14. A process according to claim 12 wherein the pH remains essentially unchanged after said neutralization and prior to said separation.

* * * * *